Sept. 22, 1931.  L. R. WILLIAMSON  1,824,700
HYDRAULICALLY OPERATED REVERSING MECHANISM
Filed Jan. 15, 1927  3 Sheets-Sheet 3
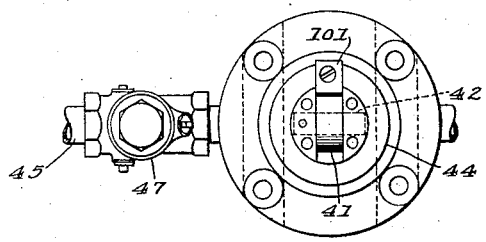
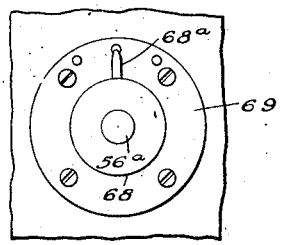
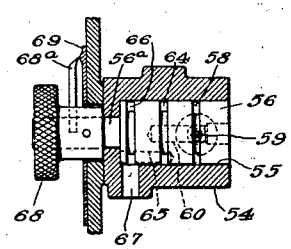
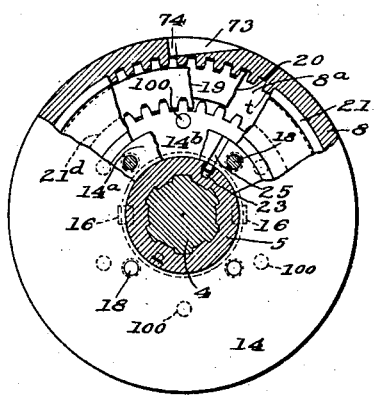
Inventor
Larkin R. Williamson
By Attorney
Albert F. Nathan Patented Sept. 22, 1931

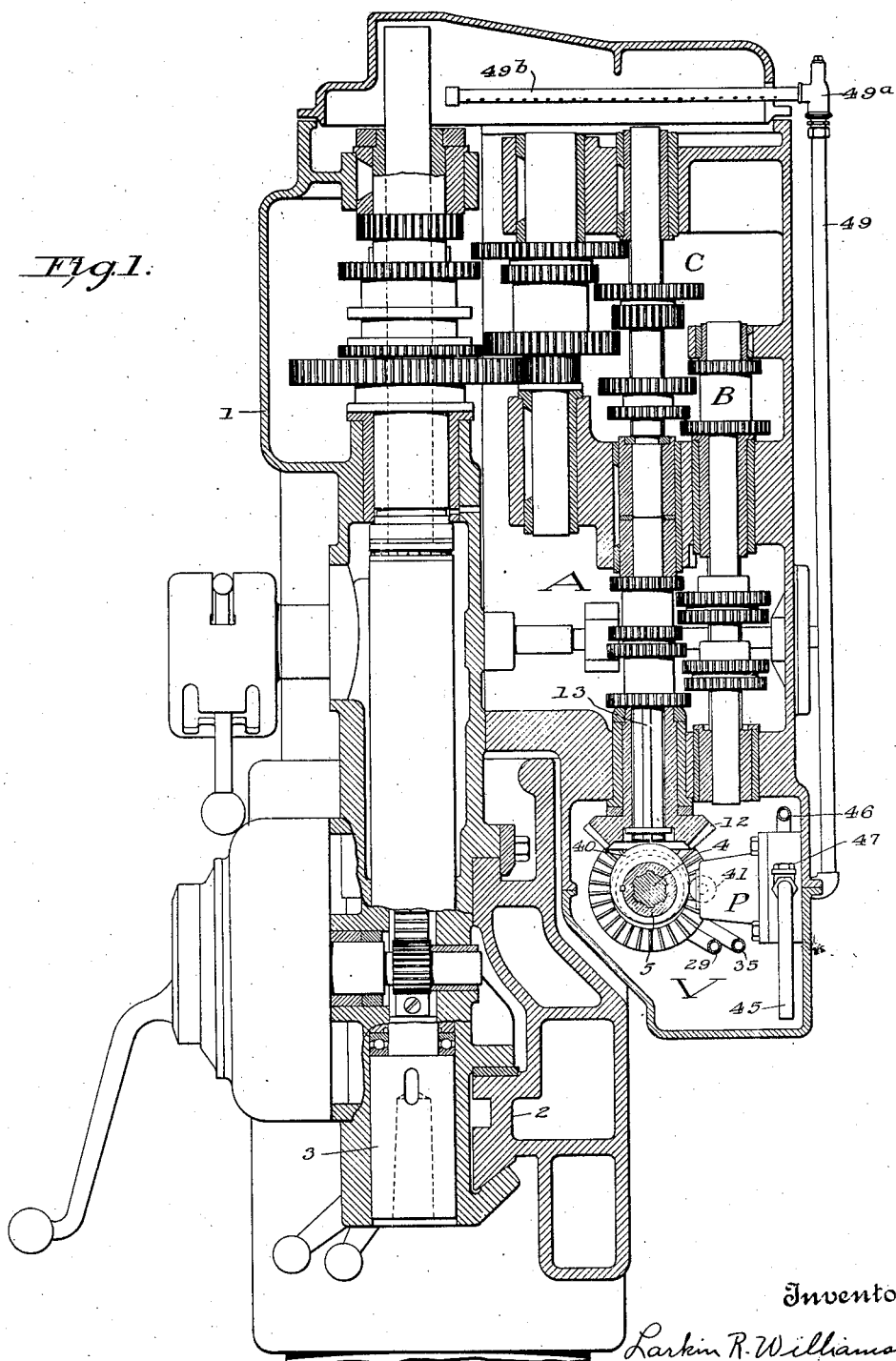

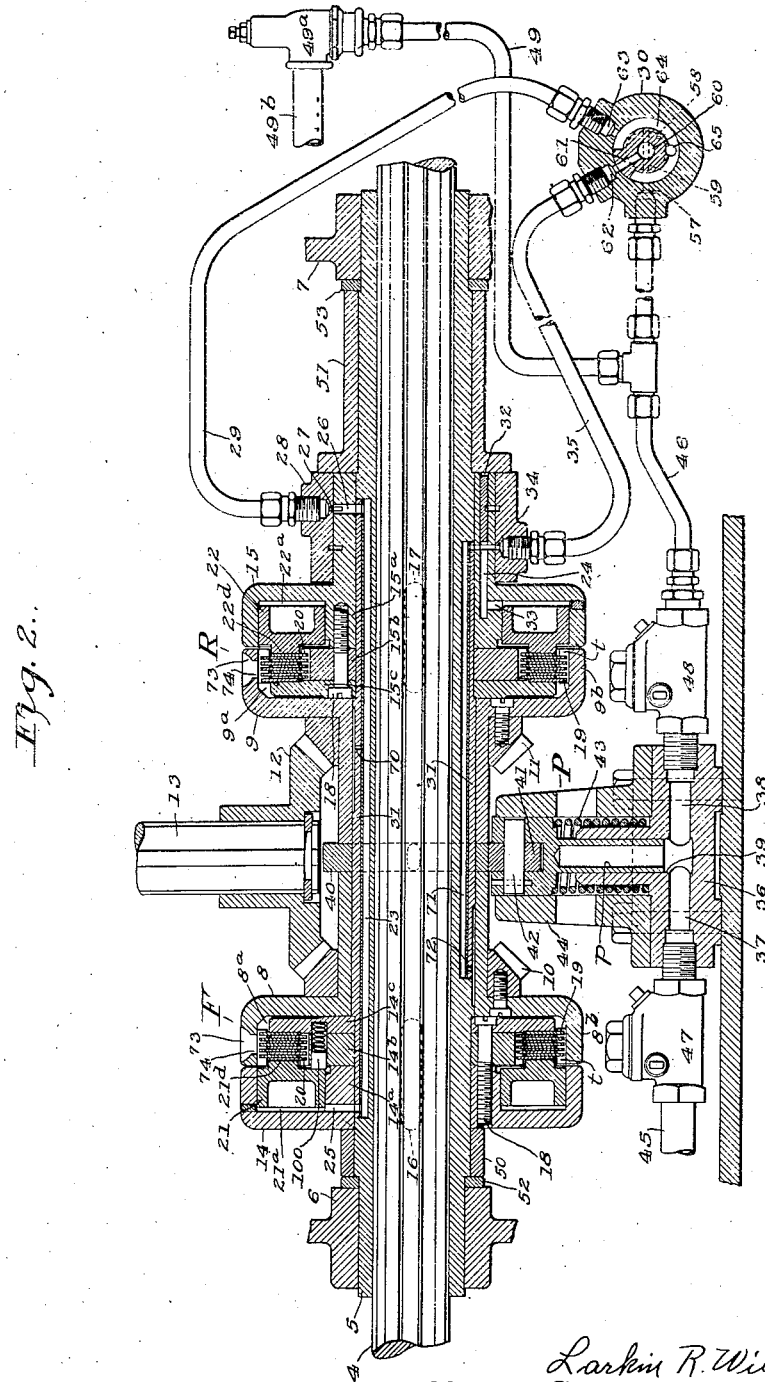

1,824,700

UNITED STATES PATENT OFFICE

LARKIN R. WILLIAMSON, OF CINCINNATI, OHIO, ASSIGNOR TO THE CINCINNATI BICKFORD TOOL COMPANY, OF CINCINNATI, OHIO, A CORPORATION OF OHIO

HYDRAULICALLY OPERATED REVERSING MECHANISM

Application filed January 15, 1927. Serial No. 161,397.

This invention deals with power transmitting devices and it relates more particularly to devices adapted selectively to transmit power in either forward or reverse directions from a uni-directional drive-shaft or other prime-mover. Although a device of this nature is adaptable for many purposes, it is particularly useful in connection with certain types of machine tools which include a member (such as a tool spindle) required to be driven first in one direction and then suddenly to be reversed. A tapping machine is a good example of a machine tool of this nature, the tap spindle being the member required to be rotated forwardly, to thread the tap into the work, and then (when the tap has entered the work the required distance) to be reversed to unscrew the tap from its tapped hole. This reversal is necessarily sudden and therefore when positive clutches are used, the parts are subjected to severe shocks and strains. It has been found that these shocks may be greatly reduced by the employment of friction clutches in the reversing unit inasmuch as that type of clutch permits a slight slippage at the instant the direction is reversed but immediately thereafter becomes sufficiently positive to transmit all the power required to rotate the tap. Many types of friction clutches heretofore have been embodied in reversing mechanisms and various means have been employed to actuate these clutches and to take up the wear therein.

This invention has for an object to provide an improved power transmitting mechanism and to provide fluid pressure means for actuating the clutch (or clutches) thereof.

Another object of the invention is to render available a reversing unit embodying forward and reverse drive clutches of the multiple disk type and to provide manually controlled fluid pressure means selectively to actuate said clutches.

Still another object is to provide an improved reversing mechanism embodying fluid pressure actuated driving clutches and to provide a single fluid pressure system for actuating said clutches and for continuously lubricating the bearing surfaces of the reversing mechanism.

A still further object of this invention is to provide an improved hydraulically actuated reversing mechanism adapted to be embodied in the tool head of a drilling and tapping machine and to utilize a single continuously acting pump and lubricant supply selectively to actuate either forward or reverse drive clutches; to maintain the selected clutch effective to transmit power; to lubricate the parts of the reversing mechanism and to utilize the overflow from the pump to lubricate the speed change gearing, shaft bearings etc. in the tool head.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which;—

Figure 1 is a vertical sectional view of a drilling and tapping machine head equipped with the improved hydraulically actuated reversing mechanism and showing means for lubricating the mechanism within the head by oil circulated by the pump which also supplies fluid pressure to actuate the reversing mechanism. Fig. 2 is an enlarged longitudinal section of the reversing unit, the pump actuated by the unit for supplying fluid pressure to actuate the clutches thereof, and the manually controlled valve for selectively applying fluid pressure to either clutch and simultaneously releasing the other clutch; the pump being shown as moved 90° above the drive shaft from the position shown in Fig. 1. Fig. 3 is a detail of the controlling valve. Fig. 4 is a left end view of Fig. 3, showing the valve actuating wheel, an indicator carried thereby and an index cooperating with the indicator.

Fig. 5 is a plan of the pump shown in Fig. 2. Fig. 6 is an elevation, partly in section of one of the friction clutches.

Referring more particularly to the drawings the invention is disclosed as embodied in the head 1 of a radial drilling and tapping machine. This head may be of conventional form and, as is the usual practice, may be translatably mounted on a radial arm 2 and may rotatably and translatably support the usual tool spindle 3. Power to rotate and translate the tool spindle is preferably provided by a shaft 4 journaled lengthwise of the arm. For the purpose of this disclosure, the shaft 4 will be considered the uni-directional prime-mover from which oppositely directed rotary motion is to be transmitted to a forwardly and reversely rotatable element to wit:—the tool spindle.

As is common to machine tools of this nature, a plurality of speed change devices are interposed between the prime-mover and the spindle to afford a considerable number of changes in the speed of rotation of the tool spindle, as is required by the various operations and working conditions. These speed changes are preferably afforded by one or more sliding change gear mechanisms located within the tool head. In the head illustrated three change gear sets are provided and these sets provide, respectively, four, two and four speeds which together render available thirty-two speeds in the tool spindle. These speed-change devices are designated generally as A, B, and C. Inasmuch as these gears, and the shafts on which they are mounted, are continuously rotating it is essential that the gears and shaft bearings be kept well lubricated, and it is one of the objects of this invention to accomplish this lubrication from the same pump that supplies fluid pressure to actuate the clutches of a reversing mechanism hereinafter to be described.

To perform certain operations, it is necessary that the tool spindle be rotated alternately in forward and reverse directions and this invention provides improved mechanism for accomplishing these oppositely directed rotations from the uni-directional rotation of the arm shaft. This improved reversing mechanism, which also may be used for various other purposes, is illustrated in Fig. 2 and includes a driving sleeve 5 journaled in bearings 6 and 7 provided by the tool head. This sleeve has a splined connection with the drive shaft which permits the head to be shifted lengthwise of the arm while maintaining a driving connection between the shaft and the sleeve. Rotatably journaled on the sleeve are annular members 8 and 9 comprising the driven elements of forward and reverse drive clutches designated generally as F and R. These clutch members carry bevel gears 10 and 11 maintained permanently in mesh with diametrically opposite sides of a similar gear 12, fixed upon a shaft 13 journaled in the tool head and from which oppositely directed rotations are transmitted to the spindle at varying rates through the change gear mechanism hereinbefore referred to. For convenience the shaft 13 will hereinafter be termed the power delivery shaft.

The clutches F and R also include annular members 14 and 15, respectively, fixed, as by keys 16 and 17, to rotate continuously with the sleeve 5. The members 14 and 15 are held against axial movement in one direction by thrust sleeves 50 and 51 and thrust rings 52 and 53 interposed between said sleeves and the bearings 6 and 7. It will readily be perceived that, with the shaft 4 rotating in a given direction, should a driving connection be established between the members 14 and 8 the gear 12, shaft 13 and finally the tool spindle, would be rotated in one direction, whereas should a driving connection be established between the members 15 and 9 the gear 12 and connected parts would be rotated in the opposite direction. Any suitable means may be utilized to lock the driving and driven elements of the clutches together but this invention contemplates the use of the most improved type of friction clutch for this purpose; to wit, a multiple disk friction clutch. To this end the members 8 and 9 are formed with chambers $8^a$ and $9^a$ adapted to receive portions of the driving elements 14 and 15. For convenience of manufacture and assembling the driving elements are built up of three separate pieces viz outer chambered members $14^a$—$15^a$ intermediate members $14^b$—$15^b$ having toothed peripheries, and annular plates $14^c$—$15^c$ all of which may be securely held together by screws as 18.

The driven members 8 and 9 are formed with peripheral flanges $8^b$ and $9^b$ provided with internal teeth $t$ which receive the toothed peripheries of driven clutch disks 19 arranged between similar driving disks 20 having a toothed engagement with, and driven continuously by, the intermediate members $14^b$—$15^b$.

To effect a driving connection between the driving and driven elements of the clutches it is merely necessary to force the disks 20 and 19 into contact with sufficient pressure to prevent slippage therebetween. Various mechanical means heretofore have been provided for effecting this clamping together of the disks but this invention provides new and improved means whereby this result may be accomplished by fluid pressure. To that end the plates $14^c$ and $15^c$ are arranged adjacent one face of the driven disks 19 to hold them against axial movement in one direction and adjacent the opposite face of the driving disks are arranged axially movable rings 21 and 22 fitted within chambers 21ᵃ and 22ᵃ formed in the driving members 14 and 15. These rings have annular contact surfaces 21ᵈ and 22ᵈ adapted to bear against one side of the disks to force them into driving contact, as they are held against movement by the plates 14ᶜ and 15ᶜ which constitute thrust walls. The rings 21 and 22 are in the nature of pistons, and fluid pressure to move them to effect a driving contact between the disks is introduced therebehind through ducts 23 and 24. Spring pressed plungers 100 fitted within apertures in the members 14ᵇ and 14ᶜ and 15ᵇ—15ᶜ serve to retract the pistons when the fluid pressure therebehind is relieved. The duct 23 is formed in the sleeve 5 and communicates at one end with the chamber 21ᵃ through a port 25 in the driving member 14. The other end of the duct 23 is connected through a port 26, formed in the hub of the driving member 15, with an annular chamber 27 formed in a bearing member 28 which surrounds said hub. A pipe 29 affords communication from a fluid control valve 30 to the chamber 27. The duct 23 preferably is formed in the sleeves by milling a groove therein, and to eliminate the wear which normally would be caused in the parts rotatable thereabout by the edges of the groove, a bar 31 of suitable material such as bronze is fitted therein. This bar closes the duct 23 and makes the outer surface of the sleeve practically unbroken.

The duct 24 is formed by drilling a hole 32 lengthwise of the hub of the driving member 15 and then drilling a transverse hole 33 from the periphery of the member 15 into the hole 32. The outer ends of the holes 32 and 33 may then be plugged. The duct 24 is in constant connection with an annular groove 34 in the bearing member 28 and this groove is connected with a source of fluid pressure through a pipe 35 extending from the member 28 to the fluid control valve 30.

Fluid pressure to actuate the clutches F and R may be supplied from any suitable source but preferably it will be supplied by a pump P actuated by the reversing unit. This pump may be of the reciprocating piston type and comprise a casing 36 having intake and exhaust ports 37 and 38 and a bore 39 in which a piston $p$ is slidingly fitted. The piston is preferably given its exhaust stroke by a cam 40 keyed to rotate with the sleeve 5 and which acts upon a roller 41 journaled on a pin 42 carried by a bifurcated end of piston $p$. An expansile spring 43 acts upon the piston to give it its intake stroke and to keep the roller 41 in contact with the cam 40. A sub-casing 44, encloses the spring 43 and serves as a guide for the outer end of the piston $p$. Any suitable means may be provided to prevent rotation of the piston $p$ thereby to maintain the roller 41 in contact with the cam 40. This may be effected by securing a plate 101 to the sub-casing so that one end will extend into the bifurcated end of the piston as shown in Fig. 5. The intake port of the pump is connected by a pipe 45, with a source of fluid supply which preferably is a reservoir V formed in the lower portion of the tool head, and the exhaust port has a pipe connection 46 with the control valve 30 previously referred to. To prevent return flow through the pipes 45 and 46 suitable check valves 47 and 48 are connected therewith and arranged adjacent the intake and exhaust ports respectively. These check valves are of conventional form and therefore detailed illustration thereof is deemed unnecessary. The pump P may be supported adjacent the actuating cam in any suitable way, such for example, as by being secured to a stationary part of the tool head as shown in Fig. 1.

Intermediate the check valve 48 and the control valve 30, a relief line 49 is connected with the pipe 46 and serves as an exhaust for the pump both when the valve 30 is set to neutral and when either of the clutches F or R are completely actuated to effect a drive. This relief line also performs a second function, to wit:—it extends to the upper portion of the tool head where it is provided with a suitable relief valve 49ᵃ which maintains a pressure in the pipes 49 and 46 sufficient to actuate the clutches F and R, and a perforated pipe 49ᵇ connected with the relief valve sprays out lubricating material which cascades down over the gears and through the bearings in the head thereby continuously lubricating all of the contact surfaces in the head. The lubricant eventually finds its way back to the reservoir and is again taken up by the pump and circulated through the head. Thus it will be seen that, by this arrangement, a single pump and fluid supply serves both to provide fluid pressure to actuate the clutches and also to lubricate all of the mechanism in the tool head.

The control valve 30, which is located at some convenient place on the tool head, may be of any suitable construction but preferably it will be made as shown in Fig. 3 and will comprise a casing 54, formed with a cylindrical bore 55 in which a valve plug 56 is rotatably held. Fluid from the pipe 46 enters the valve 54 through a port 57 (see Fig. 2) which is maintained in alignment with an annular groove 58 in the plug 56. The groove therefore is constantly filled with oil under pressure. Radial apertures 59 connect the groove 58 with a bore 60 in the valve plug and another radial aperture 61 conveys the oil to the periphery of the plug. Ports 62 and 63 in the valve casing communicate with the pipes 35 and 29, respectively, and by aligning the aperture 61 with either of these last named ports, by rotation of the valve plug, fluid pressure selectively may be transmitted to either of the clutches F or R.

In Fig. 2 the aperture 61 is shown as aligned with the port 62 and therefore fluid pressure is being transmitted through the pipe 35, groove 34, duct 24, and ports 33 behind the piston 22 which causes the clutch R to be rendered effective to transmit motion from the shaft 4 to the shaft 13. In this position fluid pressure is being exhausted from the clutch F through duct 23, port 26, pipe 29, port 63 into a groove 64 formed in the valve plug 56. This groove does not completely circumscribe the valve plug but terminates short of the opposite sides of the aperture 61. Connected with the groove 64 is a bore 65 which also connects with an annular groove 66 in the valve plug, and a drain port 67, formed in the valve casing connects with this last named groove and serves to return, to the reservoir, the oil being exhausted through pipe 29, port 63, groove 64, bore 65 and groove 66.

To facilitate setting of the valve 30, thereby selectively to render effective either of the clutches, the stem 56ᵃ of the valve plug may have secured to it a knurled hand wheel 68 provided with a pointer 68ᵃ which cooperates with suitable indicia provided by an index plate 69.

An important feature of this invention consists in effecting generous lubrication of the bearing surfaces of the reversing mechanism by the same pump and fluid supply that provides fluid pressure for actuating the clutches. To that end an aperture 70 is formed through the bar 31 which permits the oil under pressure in the duct 23 to flow outwardly and lubricate the bearing surfaces of the sleeve 5 and the hub of the driven clutch member 9. The bearing surfaces of the driven clutch member 8 and the sleeve 5 are likewise lubricated by the oil under pressure which flows through the pipe 35 to actuate the clutch R. To conduct the oil from the pipe 35 to these last named bearing surfaces, the sleeve 5 is formed with a duct 71 which communicates at one end with the duct 24, and which, like the duct 23, is closed by a suitable bar or plate 31. At its opposite end the duct 71 is connected with the bearing surface of the driven clutch member 8 by an aperture 72 formed through the bar 31. From the foregoing it will be perceived that whenever one of the clutches is rendered effective the driven member of the other clutch, which then is rotatable on the sleeve, is continuously lubricated by the same fluid that actuates the effective clutch.

Means also is provided for lubricating the clutch disks and the contact surfaces of the pistons 21 and 22 and their respective cylinders. This is effected by forming recesses 73 in the peripheries of the driven clutch elements 8 and 9. During rotation of the clutch elements these recesses collect a slight amount of the oil cascading down through the tool head from the pipe 49ᵇ and directs it, through a port 74, into the interior of the clutches where it lubricates all of the parts therein.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore such adaptations should be, and are intended to be, comprehended within the meaning and range of equivalency of the following claims;—

Having thus revealed this invention, I claim as new and desire to secure the following combinations and elements, or equivalents thereof, by Letters Patent of the United States:—

1. A reversing unit combining a translatable casing; a non-translatable prime mover; a power delivery shaft journaled in said casing; a driven gear on said shaft; a sleeve journaled in the casing and rotatable with the prime mover; two driving gears journaled in said casing and permanently in mesh with diammetrically opposite sides of the first named gear; a disk clutch associated with each of said driving gears and each adapted when actuated, to cause its gear to rotate with said prime mover thereby to rotate the driven gear; a pump translatable with said casing and actuated by said sleeve and adapted to supply fluid pressure to actuate said clutches; a valve connected with the exhaust of said pump and adapted to direct fluid pressure from said pump alternately to said two clutches thereby to connect said pump alternately to said two clutches to effect oppositely directed rotations in the power delivery shaft; and a reservoir provided by walls of said translatable casing.

2. A drilling and tapping machine combining a tool head; a tool spindle rotatably journaled therein; a drive shaft; a sleeve rotatably journaled in said tool head and having a splined connection with said drive shaft; a power delivery shaft journaled in said tool head; a bevel gear on said power delivery shaft; two bevel gears rotatably journaled on said sleeve and meshing with diametrically opposite sides of the first mentioned gear; friction clutches adapted to clutch said two bevel gears to said sleeve; speed change mechanism located in said tool-head and operatively connecting the power delivery shaft with said spindle; a reservoir in said head; and a single pump adapted to supply fluid pressure to actuate said clutches and to effect continuous lubrication of said speed change from lubricant in said reservoir.

3. A machine tool combining a head; a member rotatable therein; a prime-mover; a driven shaft; a driving train between said driven shaft and said rotatable member; forward and reverse drives between said prime mover and said driven shaft; a fluid actuated friction clutch embodied in each of said drives; a fluid reservoir; a fluid pump adapted to draw fluid from said reservoir and forcibly to eject it through a fluid pressure line; a relief line connected with said pressure line; a relief valve in said line offering a resistance to said pump thereby maintaining pressure in said pressure line; a clutch control valve connected with said pressure line; fluid conduits connecting said valve with said two clutches; and means permitting said control valve to be actuated to connect either of said conduits with said pressure line selectively to actuate said clutches.

4. A reversing mechanism combining a movable casing; a single uni-directionally rotated prime-mover; a sleeve rotatable with said prime mover and movable with said casing; a power delivery shaft; forward and reverse drives between said prime-mover and said delivery shaft; a friction clutch embodied in each of said drives, each of said clutches including relatively rotatable driving and driven elements and a series of friction disks fixed to each of said elements and held against movement in one direction by a thrust wall provided by one of said members and located at one side of said disks; a chamber formed in one of said elements; a piston fitted within said chamber and located adjacent the other side of said friction disks; a pump actuated by said sleeve and movable with the casing and means to admit fluid pressure from said pump behind said piston to cause it to force said disks toward said thrust wall thereby to effect a driving contact between said disks.

5. A reversing mechanism combining a drive shaft; a driven shaft; a sleeve rotatable with said drive shaft; forward and reverse drives between said drive shaft and said driven shaft; a clutch mechanism embodied in each of said drives each of said clutch members including an element rotatable relative to said sleeve when its clutch is ineffective; and means to effect forced lubrication of the bearing between said element and said sleeve.

6. A reversing mechanism combining a drive shaft; a driven shaft; a sleeve rotatable with said drive shaft; forward and reverse drives between said drive shaft and said driven shaft; a clutch mechanism embodied in each of said drives each of said clutch members including an element rotatable relative to said sleeve when its clutch is ineffective; fluid pressure means adapted selectively to render effective either of said clutch mechanisms; and fluid connections for leading fluid which actuates one clutch mechanism also to the bearing between the sleeve and the relatively rotatable member of the ineffective clutch mechanism to effect lubrication thereof.

7. A reversing mechanism combining a drive shaft; a driven shaft; a sleeve rotatable with said drive shaft; forward and reverse drives between said drive shaft and said driven shaft; a clutch mechanism embodied in each of said drives, each of said clutch mechanisms including a member rotatable with said sleeve, a member rotatably journaled on the sleeve and a fluid actuated friction clutch between said members; a fluid pressure system; means including piping and a duct formed in said sleeve for connecting said fluid pressure system with one of said clutches; means including piping for connecting the other of said clutches with said fluid pressure system; a lubricant duct formed in said sleeve and adapted to receive lubricant from said fluid pressure system; said sleeve also being provided with lubricant outlet ports connecting said ducts with the bearing between said sleeve and said members rotatable thereon.

8. A reversing mechanism combining a drive shaft; a sleeve rotatable with the drive shaft; a driven shaft; forward and reverse drives between said drive shaft and said driven shaft; a fluid actuated clutch embodied in each of said drives; a cam rotatable with said drive shaft; a piston pump actuated by said cam; a fluid supply; a fluid conduit connecting said supply with the intake port of said pump; a fluid pressure line connected with the exhaust port of said pump; fluid transmission conduits connected with each of said clutches; and a control valve adapted selectively to connect said fluid transmission conduits with said fluid pressure line selectively to actuate said forward and reverse clutches.

9. In a machine tool, a head; a member rotatably journaled therein and adapted to be rotated in forward and reverse directions; a uni-directionally rotatable drive shaft; a power delivery shaft journaled in said head; a driving connection between the last named shaft and said reversely rotatable member; forward and reverse drives between said drive shaft and said power delivery shaft; a fluid actuated friction clutch embodied in each of said drives; a single oil pressure system adapted to actuate said clutches and to effect continuous lubrication of the driving connection between the power delivery shaft and the reversely rotatable member, said forward and reverse drives also being constructed to receive a portion of said oil and to direct it to said friction clutches.

10. A reversing mechanism combining a movable casing, a single drive shaft, a sleeve rotatable with said drive shaft and movable with said casing; a driven shaft; forward and reverse drives between said shafts; each of said drives including a friction clutch comprising relatively rotatable members, one of which is rotatable with the drive shaft and the other of which is operatively connected with the driven shaft, a plurality of friction disks fixed relative to each of said members; a piston maintained at one side of said friction disks; a pump actuated from said sleeve and adapted to supply fluid pressure to actuate said clutches; and means to admit fluid pressure behind the piston of either of said clutches to cause it to lock said disks together thereby to establish a driving connection between the driving and driven shafts.

11. A reversing mechanism combining a drive shaft; a driven shaft; a sleeve mounted on said drive shaft to rotate therewith; forward and reverse drives between said sleeve and said driven shaft each drive comprising a member rotatably mounted on said sleeve operatively connected to said driven shaft, a clutch for connecting the member to the sleeve, and fluid pressure means for operating said clutch; fluid passages in said sleeve for conducting fluid to each of said fluid pressure means; and control means therefor.

In witness whereof, I have hereunto subscribed my name.

LARKIN R. WILLIAMSON.